F. POPE.
APPARATUS FOR PRESSING AND DRYING HOSIERY.
APPLICATION FILED JULY 15, 1912.

1,162,100.

Patented Nov. 30, 1915.
7 SHEETS—SHEET 1.

Witnesses
Martin H. Olsen
Robert Dobberman

Inventor
Frank Pope
By Rector, Hibben, Davis & Macauley
His Attys.

F. POPE.
APPARATUS FOR PRESSING AND DRYING HOSIERY.
APPLICATION FILED JULY 15, 1912.

1,162,100.

Patented Nov. 30, 1915.
7 SHEETS—SHEET 4.

Witnesses
Martin H. Olsen
Robert D. Obberman

Inventor
Frank Pope
By Rector, Hibben, Davis & Macauley
His Attys

F. POPE.
APPARATUS FOR PRESSING AND DRYING HOSIERY.
APPLICATION FILED JULY 15, 1912.

1,162,100.

Patented Nov. 30, 1915.
7 SHEETS—SHEET 5.

UNITED STATES PATENT OFFICE.

FRANK POPE, OF KANKAKEE, ILLINOIS, ASSIGNOR TO THE PARAMOUNT KNITTING COMPANY, OF CHICAGO, ILLINOIS, A CORPORATION OF ILLINOIS.

APPARATUS FOR PRESSING AND DRYING HOSIERY.

1,162,100.

Specification of Letters Patent. Patented Nov. 30, 1915.

Application filed July 15, 1912. Serial No. 709,453.

*To all whom it may concern:*

Be it known that I, FRANK POPE, a citizen of the United States, residing at Kankakee, Kankakee county, and State of Illinois, have invented a new and useful Apparatus for Pressing and Drying Hosiery, of which the following is a specification.

My invention relates to the manufacture of hosiery and the same consists of an apparatus for finishing the hosiery in a novel and automatic manner.

Speaking in general terms, my invention comprises in its broader aspect apparatus which pressing the hosiery, or at least the foot portion thereof, while on the forms or so-called boards and in its narrower aspect it comprises apparatus for both pressing and drying the hosiery on the forms or boards, the pressing being preferably preliminary to the drying.

My apparatus is adapted and arranged to receive at its front end the hosiery which has been stretched upon the forms or boards, to thereupon press the hosiery, preferably the foot portion only, while on the forms, to pass the same through a drier and to finally discharge such hosiery at the rearward end of the machine, at which point an attendant removes the hosiery from the forms, provision being made on one side of the machine for the return of the forms to the attendant, or operator, at the forward end of the machine. With the exception of the operations of applying and removing the hosiery to and from the forms, all of the operations are automatic, and, moreover, provision is made by the adjustment of parts for different sizes or lengths of hosiery.

In the drawings, Fig. 13, a section on the line 13, 13 of Fig. 10, and Fig. 14 a perspective view of one of the metal hosiery forms.

Figure 1:
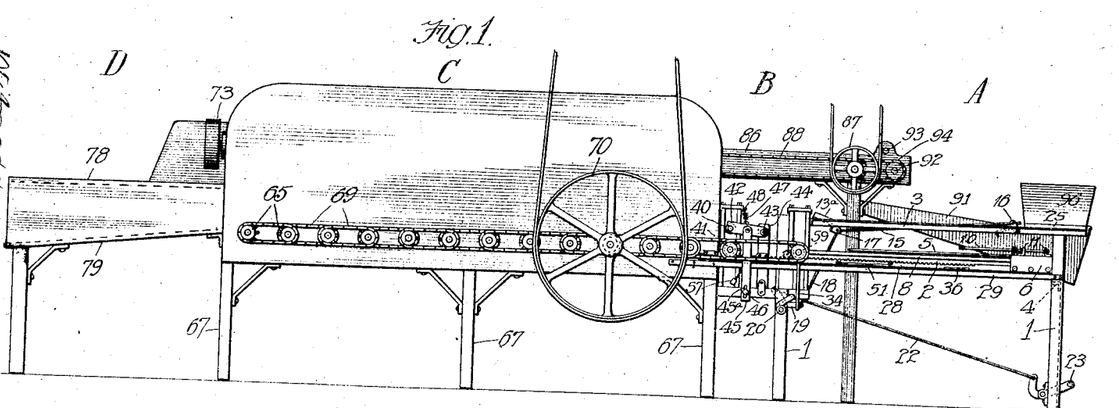
Figure 1 is an elevation of one side of the machine.
Figure 2:
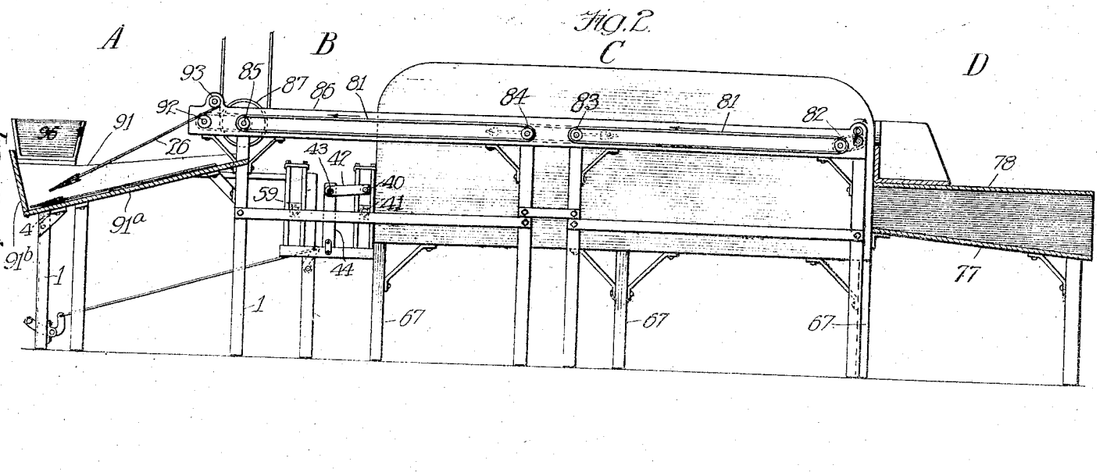
Fig. 2, an elevation of the other side thereof showing portions in the section.

The machine, or apparatus, comprises four different departments which act in succession upon the hosiery, the different departments or sections comprising: 1st, the receiving mechanism and carriage mechanism at the front of the machine and indicated for general location by the reference letter A in Figs. 1 and 2; 2nd, pressing mechanism, indicated at B; 3rd, the drier indicated at C; and 4th, the delivery section indicated at D. I shall now proceed to describe the parts of the machine in the order just mentioned.

Figure 4:
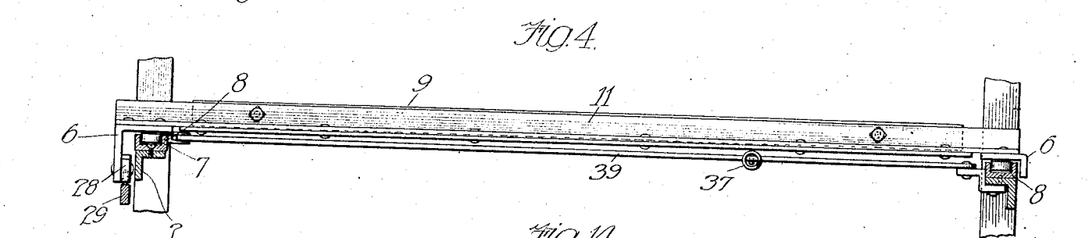
Fig. 4, a sectional detail on the line 4, 4 of Fig. 9.
Figure 10:
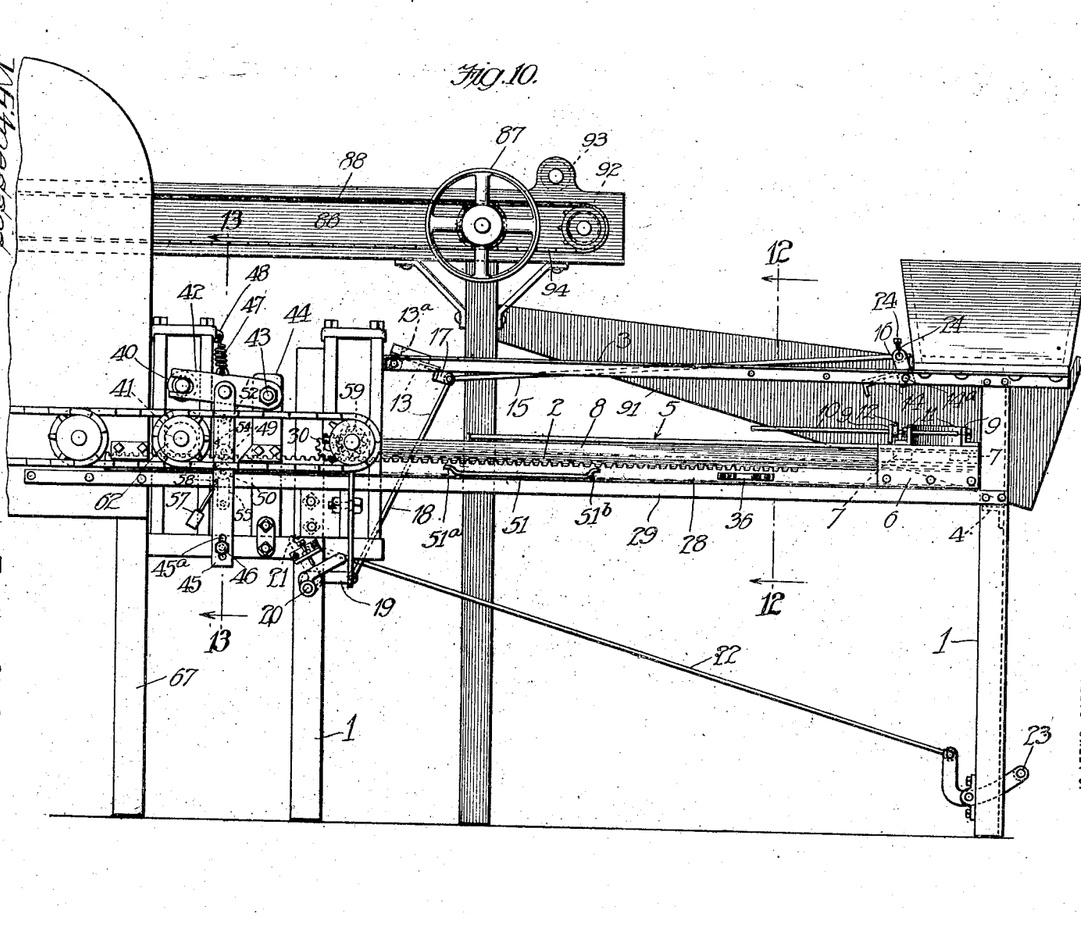
Fig. 10, a side elevation of the forward portion of the machine, but on a larger scale than in Figs. 1 and 2, etc.

The receiving and carriage mechanism, which is located at the forward end of the machine, comprises a suitable frame including a stationary table and a carriage whereby the stockings on the forms or boards are first received and then delivered to the pressing mechanism. In the present instance this frame consists of suitable upright supports or legs 1, longitudinal horizontal rails 2, 2 and 3, 3 and end rails or cross pieces 4. Upon this frame is mounted a horizontal table 5 which projects forwardly a limited distance, as shown in Figs. 1 and 10. Upon this frame is mounted to reciprocate the forwardly and backwardly movable carriage, which includes opposite parallel rails 6, 6, having at certain points in their length depending rollers 7 which are received within the channels of the rails 8, secured to the side rails 2 in suitable manner, as clearly shown in Fig. 4.

Figure 9:
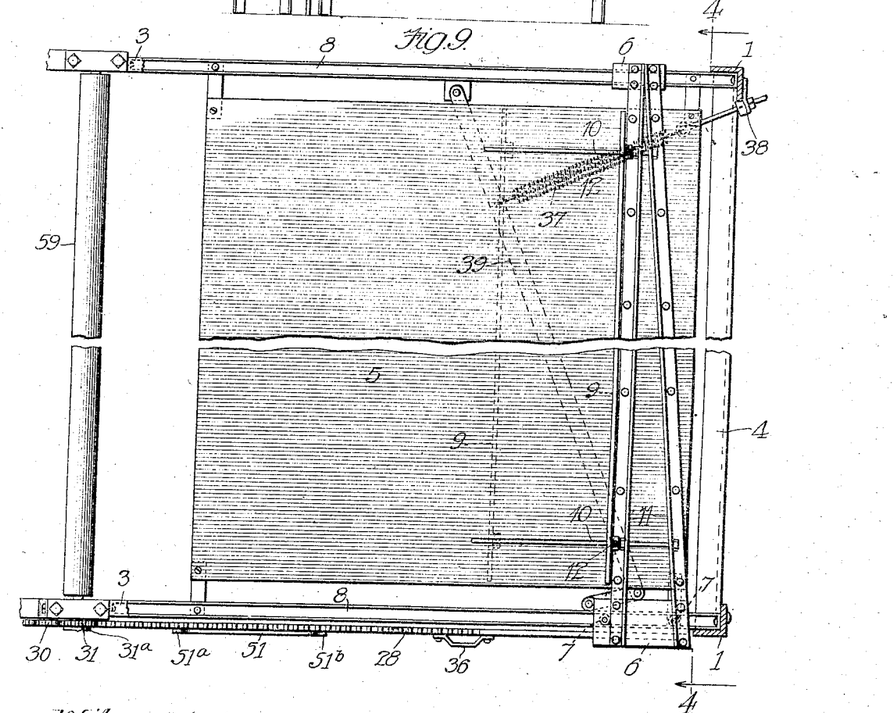
Fig. 9, a section on the line 9, 9 of Fig. 1, but on a larger scale.

The table 5 is provided with a transverse gage plate 9 which is adjustable longitudinally of the machine for the purpose of accommodating stockings of different lengths. To this end, and referring more particularly to Figs. 1, 9 and 10, this gage plate is strung and adjustable upon the two parallel longitudinal extending rods 10, one of whose ends is secured to the cross bars 11 which form a part of the carriage by connecting together the four ends of the rails themselves. The other, or free, ends of these rods 10' project rearwardly over a portion of the table 5, and it is upon them that the gage plate 9 is adjustable to any desired position, which is preferably and in practice marked upon these rods to correspond with the length of the particular stockings being operated upon. The gage plate is held in position on these rods in suitable manner as by means of the set screws 12, or the like.

Above the table means are arranged for preliminarily holding a plurality of stockings on their forms until the complete number thereof, representing the capacity transversely of the machine, is attained, whereupon the operator causes all of the stockings to be simultaneously dropped upon the table, in advance of the gage plate which then begins to move rearwardly with the stockings to be operated upon by the machine, as hereinafter explained. It will be understood that the machine may be made of any depth to accommodate any number of stockings on the forms, although a machine having a capacity of six to eight stockings at a time will be found more convenient and satisfactory to operate.

Figure 11:
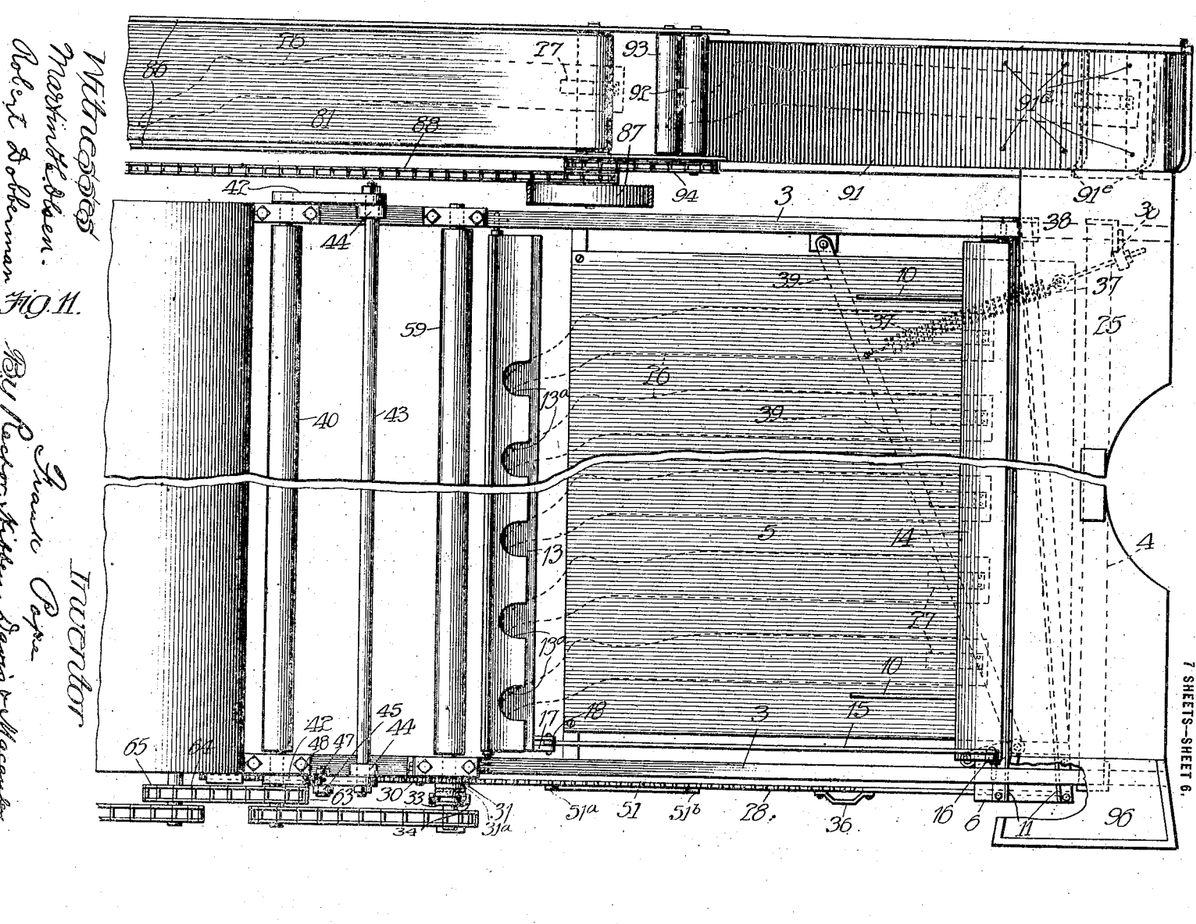
Fig. 11, a plan view of the parts shown in Fig. 10.
Figure 12:
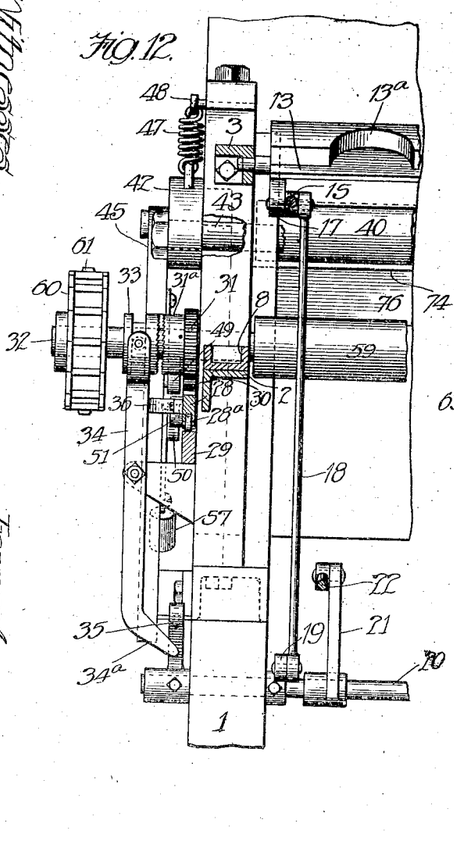
Fig. 12, a section on the line 12, 12 of Fig. 10.

Referring to Figs. 1, 10 and 11: this mechanism for receiving the stockings and subsequently dropping them upon the table comprises, in the present instance, two oscillating cross strips or bars 13 and 14, the former receiving and supporting the toe ends of the stockings and the latter, the leg ends thereof. These cross bars are mounted to rock or oscillate in end bearings in the upper horizontal rails 3 of the frame, and the same are caused to operate and to move in unison toward and away from the plane of the table in suitable manner, as by means of the connections shown, which include a connecting rod 15 pivotally connected with the bar 14 through the medium of the vertically extending lug 16 above the pivotal point of such bar, Fig. 10. The other end of this rod 15 is pivotally connected to a forwardly projecting lug 17 on the cross bar 13, with the result that any motion imparted to the latter bar will be transmitted to the other bar 14. This lug 17 has pivoted to it the upper end of a connecting rod 18, whose lower end is pivotally connected to the outer or front end of a rock arm 19, mounted upon the transverse rock shaft 20. This shaft extends transversely of the machine and bears at its ends in two opposite legs 1 of the frame, Figs. 1, 10 and 12. To this shaft is secured a rock arm 21, to the upper end of which is pivotally connected a long rod 22 extending forwardly of the machine and pivotally connected to a suitable treadle device, indicated at 23, Figs. 1, 2 and 10. It will be understood that by depressing this treadle the two bars 13 and 14 are oscillated downwardly from their inclined receiving position, shown in Fig. 10, with the result that the supports for the ends of the stockings on their forms will be removed and the same will be dropped downwardly upon the table 5, simultaneously with which operation the carriage and gage will be moved in a rearward direction, as hereinafter explained.

As shown, and by preference, the cross bar 13 is notched at regular intervals, as indicated at 13ª, in order to receive and space the toe portions of the stockings. The bearing ends 14ª of the cross bar 14 are adjustable longitudinally of the rails 3, in order to accommodate stockings of different lengths, and at the same time the pivotal connection between the rod 15 and the lug 16 is adjustable along such rod in any suitable manner, and the adjustment is maintained in any desired way as by means of the set screw 24.

Figure 14:
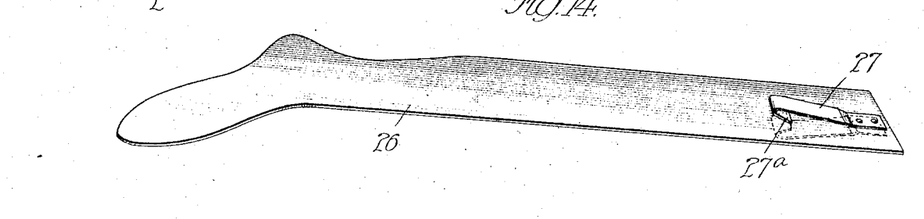

In practice, the operator stands at the front of the machine at the middle cutaway portion of the horizontal board, or table, 25, which he uses in the operation of applying the stockings to the forms, one of which is shown by itself in Fig. 14. The forms heretofore and usually employed are made of wood and are therefore commonly referred to in practice as "boards", but in the present instance I make these forms of metal, preferably aluminum, thereby avoiding the wear, shrinkage and breakage which is incident to the use of wooden forms. Referring to Fig. 14, the metal form 26 is moreover provided at the leg end with catches or clamps, which are made in such a manner as not only to effectively hold the stockings on the forms to maintain their proper lengths, but also as to permit of their ready and convenient manipulation through the machine as well as by the attendant at the rearward end of the machine, in stripping the stockings from the forms, I therefore provide upon opposite sides of each form a catch or clamp 27 which is of spring metal, preferably tempered and secured at one end to the form and having its other, or free end inwardly and reversely bent to form the jaw or unclutching portion 27ª. In practice the operator draws the stocking over the form with the extreme leg ends underneath these clamps. After this operation the operator lays the stockings thus on their forms on the cross bars 13 and 14 until the capacity of these bars is reached, whereupon, in the manner already explained, these stockings are dropped downwardly upon the table 5.

Referring to the reciprocating carriage and the means for operating it, Figs. 10, 11, 12 and 13, the carriage is provided along one side with a long rack bar 28, the rack teeth projecting upwardly. This rack bar bears upon a horizontal rail 29 through the medium of a series of rollers 28ª, arranged in recesses on the lower edge of the rack bar at suitable points intermediate the length thereof. The rack teeth mesh with a pinion 30, mounted on the side of the machine frame and in turn meshing with a gear wheel 31 which is mounted loosely upon the drive shaft 32, but adapted to operatively connect therewith through a suitable clutch mechanism, which, in the present instance, comprises a clutch member or sleeve 31ª secured to or forming a part of the pinion 31 and having ratchet teeth on its outer face adapted to engage corresponding ratchet teeth upon the clutch or sleeve 33, which is splined upon the shaft 32 and longitudinally movable thereon. The clutch member 33 has a clutch shifter which is in the form of a lever 34 pivoted intermediate its length and operated automatically in the manner hereinafter explained. It will be understood that when the clutch is in open or unclutched position, shown in Fig. 12, the carriage is either in a state of rest at the forward end of the machine or is in the act of being returned to such position, as hereinafter described. However, when the clutch shifter operates the clutch to cause engagement between the members thereof, the gear wheel 31 and pinion 30 will be rotated and the carriage will be reciprocated rearwardly of the machine through the medium of the rack bar 28.

When the rock shaft 20 is operated by the treadle for dropping the stockings upon the table 5, as hereinbefore explained, a rock arm 35 secured to one end thereof is rocked against the lower inturned end 34ª of the clutch shifter 34, with the result that such end is moved outwardly away from the frame of the machine and its upper end thrown inwardly thereby causing clutch engagement between the clutch members 31ª and 33. Consequently, as soon as the stockings are dropped upon the table the carriage, together with the gage, will be moved rearwardly of the machine until such reciprocation is automatically stopped by throwing out the clutch. In the present instance this is accomplished by means of the projection 36 forming a part of or secured to the rack bar and extending laterally thereof, so as to contact with the open portion of the clutch shifter 34 and to thereby force the same, together with its clutch member, outwardly when such projection reaches the proper position for this purpose. The carriage may be returned in any suitable manner, but, in the present instance, it is returned by means of a coil spring 37 secured at one end at 38 to a stationary part of the main frame and the other end to some part of the carriage as the bar 39. It will be understood that the described rearward movement of the carriage is against the tension of the spring 37, with the result that when the clutch is disengaged the spring will instantly return the carriage to its normal forward position, during which returning movement the pinion 31 rotates freely upon the shaft 32.

Figure 13:
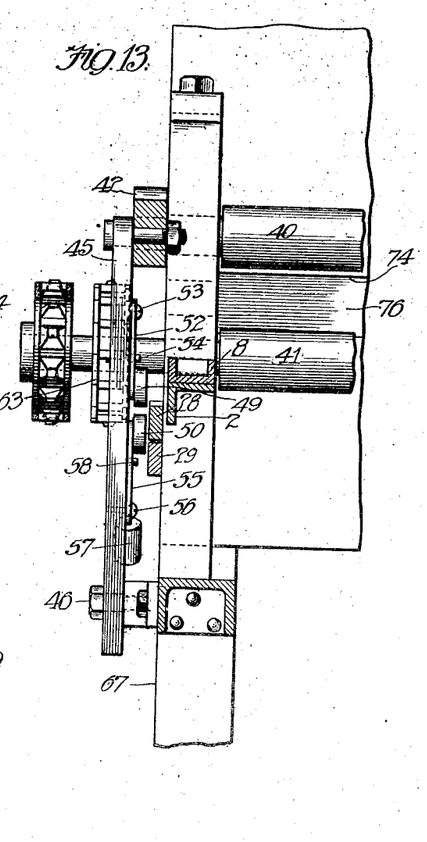

The rearward movement of the carriage is for the purpose of feeding and presenting the stockings to the pressing mechanism, now to be described. The mechanism is in practice and by preference such that only the foot portions of the stockings are pressed, the remainder of the stockings not being acted upon. The pressing mechanism consists of an oscillating pressing roll 40 extending transversely of the machine immediately in front of the drier B, and adapted to coöperate with a lower and positively driven roll 41 also extending transversely of the machine and immediately below the first named roll. The upper roll bears at its ends in the forward ends two parallel lever arms 42 at opposite sides of the machine, such levers being pivoted at their forward ends at 43 to posts or standards 44 rising from the frame of the machine. One of these levers 42 at the left hand side of the machine, according to the position of the operator, that is, the side on which the rack bar 28 is located, is pivotally connected to a vertical movable bar 45 having slide connection with the main frame through bolt and slot connection, such as the bolt 46 and the slot 45ª. This bar 45, which is located in a plane outside of the plane of the rack bar 28, Fig. 13, is adapted to be reciprocated vertically, positively in one direction by means of the rack bar, and permitted to return to its upward normal position by springs 47 secured to their lower ends to the lever 42 and their upper ends at 48, to a fixed part of the frame. For the positive downward movement of the bar 45 and the consequent lowering of the upper roll 40 to operative position, such bar 45 is provided on its inner side with the two rollers 49 and 50, which are spaced apart a proper distance in order to permit of the entrance and operation between them of a cam bar or plate 51 located intermediate the length of the rack bar 28 and extending laterally thereof. The upper roller 49 is journaled at the lower end of an arm 52 depending from its pivot pin 53 in the bar 45, Fig. 13. The swinging movement of this roller 49 is limited by stop pin 54 on the inner face of the bar 45. The roller 50 has its bearings in the upper end of the upwardly extending arm 55, which is pivoted at its lower end on pivot pin 56 in bar 45, Fig. 13. In order to keep this arm and its roller in a normal position of alinement with the longitudinal axis of the bar 45, I provide the counterweight 57, which is secured to one side of the arm 55, thereby holding the latter normally against its stop pin 58.

It will now be understood that when the rearward cam-shaped end 51ª of the cam 51 reaches the rollers 49 and 50, it will press downwardly upon the latter roller and thereby force the bar 45 and the upper roll 40 downwardly, and such downward position will be maintained by the straight portion of the cam 51 and until the forward cam-shaped end 51ᵇ reaches these rollers, whereupon the spring 47 will raise the bar 45 and oscillate the roll 40 from its operative position. The straight longitudinal portion of the cam 51 therefore represents the time and extent of the actual pressing operation, which as above stated, is intended for the foot portions only of the stockings. The distance between the forward end of this cam and the projection 36 represents the extent of travel and feeding of the stockings by the carriage after the pressing operation, during which time the legs of the stockings are passing between the rolls 40 and 41 but not being operated upon thereby, except that the lower roll acts to feed them rearwardly into the drier.

The object of pivoting the rollers 49 and 50 on the bar 45 is to permit the free return of the cam 51 without effect upon such bar, in which return movement the rollers spring outwardly and forwardly, that is, to the right in Fig. 10.

In advance of the rolls described is a transverse feed roll 59, which is secured to or forms part of the drive shaft 32. These rolls 41 and 59 may be driven in any suitable manner as, for instance, by the following driving connections: At one end of the shaft 32 is a sprocket wheel 60 connected by means of a sprocket chain 61 with a sprocket wheel 62 on one end of the shaft or axis of the roll 41. This latter shaft or roll is provided with another sprocket wheel 63, which is driven through the medium of the sprocket chain 64 by means of a sprocket wheel 65 mounted upon one of the shafts or rolls within the drier, as hereinafter explained.

Figure 3:
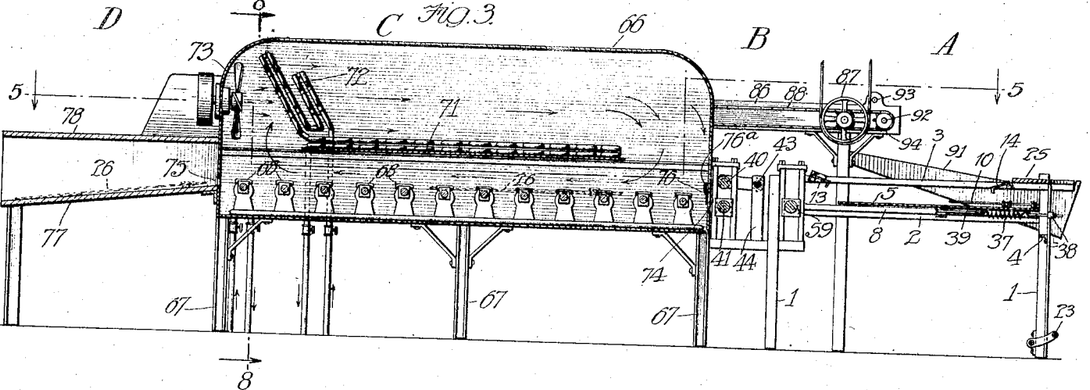
Fig. 3, a vertical longitudinal sectional elevation of the machine.

Referring next to the drier indicated generally at C in Figs. 1, 2 and 3, the same comprises a casing 66 of suitable size and dimensions and suitably heated, thereby providing a zone of heating during the travel of the stockings through the machine. This casing, which has a suitable support, such as the legs 67, has upon its bottom and interiorly thereof a series of positively driven feed rolls 68 of any suitable number and adapted to feed the series of stockings through the drier. These feed rolls are driven in any suitable manner, as by means of the series of sprocket wheels 65 (one of which has already been referred to) secured to one of their ends outside of the casing 66 and the series of sprocket chains 69, whereby all of these rolls are driven simultaneously and at uniform speed. One of these rolls is a driven one, the same being driven by a pulley 70, Fig. 1, or in any other desired manner.

The drying chamber formed by the casing 66 is divided by means of the horizontal partition 71 into an upper and lower compartment, but the same are arranged to communicate at both ends, inasmuch as such partition does not run the full length of the chamber, as shown in Fig. 3. In the upper compartment, or space above this partition, is arranged the heating mechanism which, in the present instance, comprises the steam coils 72, a portion of which is arranged horizontally immediately above the partition and another portion at one end of the drying chamber and extending upwardly immediately in front of a fan 73. This fan is located in the upper rearward portion of the drying chamber, and is driven in any suitable manner. By means of this fan a circulation of heated air is maintained through the drying chamber, the air being forced through the upwardly extending steam coils, downwardly at the forward end of such chamber and into the line of travel or feed of the stockings, and thence upwardly again through the steam coils to complete the circulation, the direction of the circulation of the air being indicated in Fig. 3 by the arrows. Sufficient fresh air is drawn through the inlet and outlet openings for the stockings.

At its forward end the drier is provided with a horizontal slot opening 74 for the entrance of the stockings from the pressing mechanism and with an exit or discharge slot 75 at the other side of the casing, these slots registering with the line of travel of the stockings, as clearly indicated in Fig. 3. In the present instance, and as shown, this drying chamber is closed or sealed except for the said openings, and although the entrance opening 74 has a closure, as hereinafter described, sufficient fresh air is received within the chamber for the efficient work of the drier. While both of these openings might be left constantly open, and while both of them may be provided with closure or flap valves, I prefer to leave the exit openings 75 open and to provide the entrance opening 74 with a closure in order that the operator standing at the front of the machine may not be subjected to any currents of hot air which may escape through this entrance opening, and be directed forwardly toward him. While any suitable form of closure may be employed, I prefer to provide a closure in the form of a flap valve 76 which is pivoted on its upper edge at 76ª at a point above said opening 74. This valve tends to close by its own gravity, supplemented by the pressure of the current of air circulating through the drying chamber. As the stockings are fed into the drying chamber, they contact with and raise this valve up and just as soon as the ends of the forms have cleared the valve, the latter will be instantly closed.

Figures 5, 6, 7:
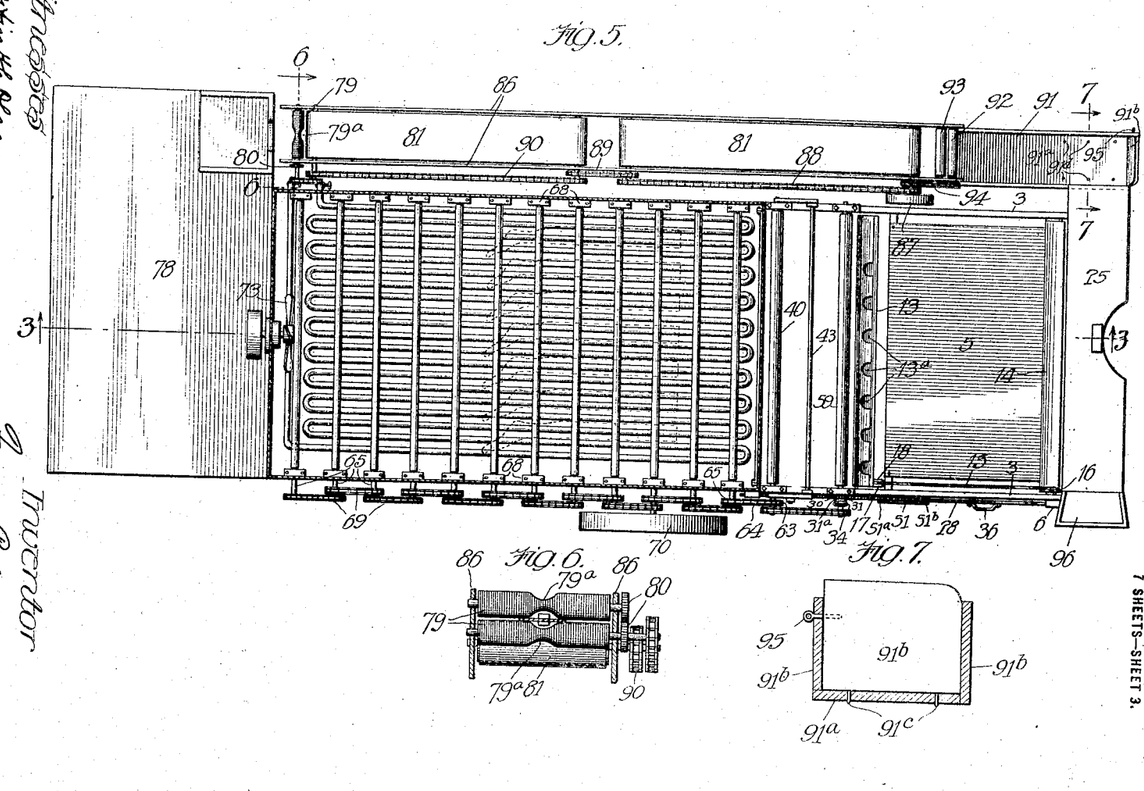
Fig. 5, a sectional plan on the line 5, 5 of Fig. 3.
Fig. 6, a section on the line 6, 6 of Fig. 5.
Fig. 7, a sectional detail on the line 7, 7 of Fig. 5.
Figure 8:
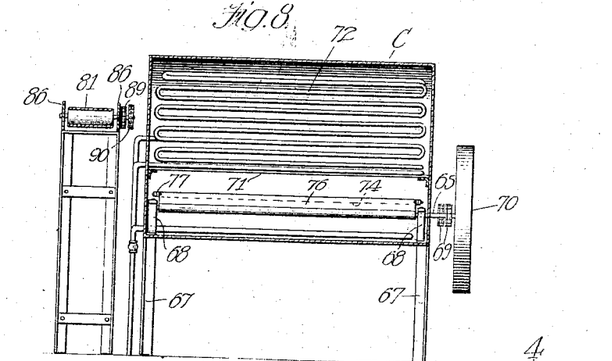
Fig. 8, a vertical section on the line 8, 8 of Fig. 3.

The stockings on their forms, after passing through the drying and being discharged through the opening 75, are delivered upon a lower table 77, from which the attendant or operator at this end of the machine takes them and works with them upon the upper table 78. The work of this operator is to strip the stockings from the forms and to place such forms in the conveyer for their return to the operator at the forward end of the machine. To facilitate this stripping work I mount at one side of the table 78 and at the head of an endless conveyer (hereinafter described) a pair of stripping rolls 79 arranged in a vertical plane and driven by the gears 80 which in turn are driven by the same driving connections as the conveyer as hereinafter described (Figs. 5 and 6). In practice, the operator, after releasing the clamps 27, places the form and stocking between these stripping rolls 79 and then holding the stocking he strips the latter from its form which is carried forward by said rolls. By preference, these rolls are covered with a soft material such as felt or the like, and a central groove 79$^a$ is provided to accommodate the clamps of the forms (Fig. 6). The form is now returned to the front of the machine by the conveyer extending along one side of the machine, as clearly shown in Figs. 2, 5, 8 and 11, the stripping and feeding device mentioned being located in immediate proximity to the conveyer.

In the present instance the conveying mechanism comprises two separate but similar endless belts or aprons 81 running over the rollers 82, 83, 84 and 85, the two foremost ones, 83 and 84 being adjustable in any suitable and well-known manner. These belts, or aprons, run in a trough formed by the two walls 86, extending substantially the full length of the machine. The conveyer may be driven in any suitable manner and, in the present instance, the roller 85 is driven by the pulley 87, from which the power is communicated through the sprocket chains 88, 89 and 90 and by sprocket wheels, coöperating therewith, to the other rollers of the conveyer, as clearly indicated in Fig. 5. At the forward end of the conveyer is located a receiver or hopper 91 having an inclined bottom 91$^a$ and an end wall 91$^b$.

In order to properly superimpose the forms as delivered to the hopper, I provide means for holding the forward ends thereof, as delivered, suspended above the pile of previously delivered forms until the other end of the form has substantially cleared the conveyer. As a result each form drops substantially flat against the under form as to its whole length, and without any danger of the last delivered form engaging the gage or clamp of the form below it. This method of delivery and the means employed to accomplish it are clearly indicated in the Fig. 2, wherein it is seen that an idler roller 92 is provided at the forward end of the conveyer and above and slightly in advance of a final or delivery roller 93, which is driven from the roller 85 by means of the sprocket chain 94. It will be observed that the forward end of the form is prevented from dropping immediately downwardly after having partially cleared the conveyer, but is held suspended until its forward end has almost reached its final position in the hopper adjacent the front wall 91$^b$. In order to accommodate forms of different lengths, I make this wall adjustable in a suitable manner, and in the present instance, as shown in Figs. 7 and 11, it is seen that this wall 91$^b$ has a couple of dowels 91$^d$ which are adapted to be inserted in any one pair of holes 91$^c$ in the bottom of the hopper, according to the desired adjustment. The wall is also held in proper position as to its upper portion by means of the pin 95 passing through the proper hole of a series of holes 91$^e$ in one of the side walls 91$^f$ of the hopper.

We have heretofore explained the operation of the different mechanisms when describing the construction of such mechanisms, and I shall now proceed to explain the operation of the machine as a continuous one, beginning with the insertion or stretching of the stockings upon the forms at the forward end of the machine, to the delivery of the stockings at the opposite end of the machine and the return of such forms to the operator at the forward end of the machine.

The operator stands in front of the work table 25 with a supply of moist stockings (in the condition in which they come from the dye house) in a box or receptacle 96 at his left-hand side and with a supply of the forms in the hopper 91 on his right-hand side. He now stretches the stockings upon the forms and sees to it that the leg ends are properly engaged by the clamps on the forms, it being understood, of course, that the forms are of the proper size and length to correspond with the particular size of stocking being operated upon. The operator now places the form with its stocking upon the temporary receiving bars 13 and 14 with the toe ends in the recesses 13$^a$ and with the other ends resting upon the bar 14. In the present instance, this receiving mechanism is of such size as to accommodate a series of seven stockings at one time, although it will be understood that this mechanism and the entire machine may be made of any desired capacity. As soon as the operator has thus completely filled this receiving mechanism, he operates the treadle 23, thereby dropping the stockings upon the table 5 and simultaneously putting the carriage in motion. As a result the gage, which forms part of the carriage, will be moved together with its stockings while on the other forms to the pressing mechanism, such stockings being initially presented to the feed roll 59 upon which the stockings are caused to travel. The stockings are then fed to the pressing mechanism, but just before reaching the rolls 40 and 41 thereof, the roll 40 is oscillated downwardly to operative position, with the result that the series of stockings are pressed or ironed as to their foot portions, and just as such portions have passed these rolls, the roll 40 is oscillated upwardly so that in the further travel of the stockings past the pressing mechanism, the leg portions of the stockings are not acted upon thereby. The stockings are then fed into the drying chamber, being received upon the series of rollers 68, which pass them through this chamber at the desired slow speed, after which they are delivered upon the table 77. The operator at this end of the machine then takes the forms one at a time and, after opening the clamps by means of the projections 80, strips the stockings from their forms and places such stockings in a pile. He then places the forms one at a time, as he strips the stockings, upon the conveyer, which conveys the same to the forward end of the machine and into the hopper 91 to be used again by the operator at the other end of the machine in the manner explained.

I claim—

1. In a machine of the class described, the combination, with a form upon which a stocking is stretched, of pressing mechanism including a pressing roll for pressing the stocking while on the forms and means for causing such mechanism to operate to press only when a portion thereof is passing through.

2. In a machine of the class described, the combination, with the forms upon which the stockings are stretched, of pressing mechanism for pressing a portion only of the stockings while on the forms, and feeding means controlling the pressing action of such mechanism.

3. In a machine of the class described, the combination of stocking feeding mechanism, means for pressing a portion only of the stocking as it is fed in longitudinal direction, and means controlled by said mechanism for operating the pressing means.

4. In a machine of the class described, the combination of means for pressing the stockings while on forms, mechanism for feeding a plurality of stockings simultaneously, and means controlled by said mechanism for operating the pressing means to pressing position.

5. In a machine of the class described, the combination of stocking feeding mechanism, an oscillating pressing roll adapted to be moved into and out of pressing action, and means controlled by said feeding mechanism for operating said roll to pressing position.

6. In a machine of the class described, the combination of stocking feeding mechanism, an oscillating pressing roll adapted to be moved into and out of pressing action, a feed roll with which said roll coöperates, and means controlled by said feeding mechanism for operating said roll to pressing position.

7. In a machine of the class described, the combination of a continuously running feed roll, a pressing roll arranged thereabove and adapted to be oscillated toward and away therefrom, a reciprocating carriage adapted to present the stockings to said rolls and means associated with the carriage to depress the pressing roll to bring it into pressing action.

8. In a machine of the class described, the combination of a continuously running feed roll, a pressing roll arranged thereabove and adapted to be oscillated toward it and away therefrom, a reciprocating carriage adapted to present the stockings to said roll and means associated with the carriage to depress the pressing roll to bring it into pressing action during a portion only of the travel of such carriage and while a portion only of the stockings is being pressed.

9. In a machine of the class described, the combination of a continuously running feed roll, a pressing roll arranged thereabove and adapted to be oscillated toward it and away therefrom, a reciprocating carriage adapted to present the stockings to said roll and means associated with the carriage to depress the pressing roll to bring it into pressing action, said pressing roll being in a normally inoperative position and adapted to be positively brought to operative position by said carriage.

10. In a machine of the class described, the combination of a continuously running feed roll, a pressing roll arranged thereabove and adapted to be oscillated toward it and away therefrom, a reciprocating carriage adapted to present the stockings to said roll and means associated with the carriage to depress the pressing roll to bring it into pressing action during a portion only of the travel of such carriage and while a portion only of the stockings are being pressed, and means for thereafter moving the pressing roll to inoperative position while the remaining portions of the stockings are passing through.

11. In a machine of the class described, the combination of a continuously running feed roll, a pressing roll arranged thereabove and adapted to be oscillated toward it and away therefrom, lever arms in which such pressing roll is mounted, an operating bar connected with one of said arms, a carriage adapted to present the stockings to said rolls and having a part into whose path a part of said bar projects whereby said pressing roll is oscillated.

12. In a machine of the class described, the combination of a continuously running feed roll, a pressing roll arranged thereabove and adapted to be oscillated toward it and away therefrom, lever arms in which such pressing roll is mounted, an operating bar connected with one of said arms, rollers mounted to swing bodily on said bar, a carriage adapted to present the stockings to said rolls and having a cam adapted to coöperate with the rollers to depress the bar and thereby oscillate the pressing roll.

13. In a machine of the class described, the combination of a continuously running feed roll, a pressing roll arranged thereabove and adapted to be oscillated toward it and away therefrom, lever arms in which such pressing roll is mounted, an operating bar connected with one of said arms, a spring normally holding the bar in raised position, a carriage adapted to present the stockings to said rolls and having a part into whose path a part of said bar projects whereby said bar is depressed and the pressing roll thereby oscillated.

14. In a machine of the class described, the combination, with a feed table and with pressing mechanism, of movable means arranged to temporarily receive a plurality of stockings on forms and when moved to drop them simultaneously upon the table.

15. In a machine of the class described, the combination, with a feed table and with pressing mechanism, of movable means arranged to temporarily support the ends of a plurality of stockings on forms and when moved to drop such stockings and forms upon the table.

16. In a machine of the class described, the combination, with a feed table and with pressing mechanism, of a pair of oscillating bars arranged to temporarily support the ends of a plurality of stockings on forms and when oscillated to drop such stockings and forms upon the table.

17. In a machine of the class described, the combination, with a feed table and with pressing mechanism, of a pair of oscillating bars arranged to temporarily support the ends of a plurality of stockings on forms and when oscillated to drop such stockings and forms upon the table, one of said bars being adjustable toward or away from the other to accommodate different lengths of stockings.

18. In a machine of the class described, the combination, with a feed table and with pressing mechanism, of means arranged to temporarily support the ends of a plurality of stockings on forms and to drop such stockings and forms upon the table, said means being adjustable for different lengths of stockings.

19. In a machine of the class described, the combination, with a feed table and with pressing mechanism, of a pair of oscillating bars arranged to temporarily support the ends of a plurality of stockings on forms and to drop such stockings and forms upon the table, one of said bars being adjustable toward or away from the other to accommodate different lengths of stockings.

20. In a machine of the class described, the combination, with a feed table and with pressing mechanism, of a pair of oscillating bars arranged to temporarily support the ends of a plurality of stockings on forms and to drop such stockings and forms upon the table, said bars being operatively connected together for simultaneous operation.

21. In a machine of the class described, the combination, with pressing mechanism and with a reciprocating carriage having a feed table, of means located above the table to temporarily receive a plurality of stockings on forms and to drop them simultaneously upon the table, and a gage plate on the table to engage the ends of the stocking forms to feed the stockings to the pressing mechanism.

22. In a machine of the class described, the combination, with pressing mechanism and with a reciprocating carriage having a feed table, of means located above the table to temporarily receive a plurality of stockings on forms and to drop them simultaneously upon the table, and a gage plate on the table to engage the ends of the stocking forms to feed the stockings to the pressing mechanism, said plate being adjustable to different lengths of stockings.

23. In a machine of the class described, the combination, with pressing mechanism and with a reciprocating carriage having a feed table, of means located above the table to temporarily receive a plurality of stockings on forms and to drop them simultaneously upon the table, and a gage plate on the table to engage the ends of the stocking forms to feed the stockings to the pressing mechanism, said plate and said means being correspondingly adjustable for different lengths of stockings.

24. In a machine of the class described, the combination, with pressing mechanism and with a reciprocating carriage having a feed table, of means located above the table to temporarily receive a plurality of stockings on forms and to drop them simultaneously upon the table operating mechanism for said carriage including a clutch, and operating connections for simultaneously operating said clutch and said means.

25. In a machine of the class described, the combination, with pressing mechanism and with a reciprocating carriage having a feed table, of means located above the table to temporarily receive a plurality of stockings on forms and to drop them simultaneously upon the table, operating mechanism for said carriage including a clutch, and mechanism under the control of the operator for simultaneously operating the clutch and said means.

26. In a machine of the class described, the combination, with pressing mechanism and with a reciprocating carriage having a feed table, of means located above the table to temporarily receive a plurality of stockings on forms and to drop them simultaneously upon the table, operating mechanism for said carriage including a clutch, mechanism for operating said clutch and said means, and means for returning the carriage.

27. In a machine of the class described, the combination of pressing mechanism for pressing the stockings while on forms, a drier, and means for conveying the stockings through the drier.

28. In a machine of the class described, the combination of pressing mechanism, a drier, means for feeding the stockings to the pressing mechanism, and means for passing the stockings through the drier and delivering them therefrom.

29. In a machine of the class described, the combination of pressing mechanism, a drier, means for feeding the stockings on forms to the pressing mechanism, means for passing the stockings and forms through the drier and delivering them therefrom at one end, and means for returning the forms to the other end of the drier.

30. In a machine of the class described, the combination of pressing mechanism, a drier, means for feeding the stockings on forms to the pressing mechanism, means for passing the stockings and forms through the drier and delivering them therefrom at one end, and a conveyer for returning the forms to the other end of the drier.

31. In a machine of the class described, the combination of pressing mechanism, a drier, means for feeding a plurality of stockings on forms to the pressing mechanism, and means for passing such plurality of stockings simultaneously through the drier and delivering them therefrom.

32. In a machine of the class described, the combination of pressing mechanism, a drier, means for feeding a plurality of stockings on forms to the pressing mechanism, means for passing such plurality of stockings simultaneously through the drier and delivering them therefrom at its discharge end, and means for returning the forms to the other end of the machine.

33. In a machine of the class described, the combination of pressing mechanism adapted to press stockings on forms, a drier having a discharge receptacle, and a conveyer for returning the forms from the discharge to the receiving end of the machine.

34. In a machine of the class described, the combination of pressing mechanism adapted to press stockings on forms, a drier, a conveyer for returning the forms from the discharge to the receiving end of the machine and a hopper located at the receiving end of the conveyer and having an end adjustable for different lengths of forms.

35. In a machine of the class described, the combination of pressing mechanism adapted to press stockings on forms, a drier, a conveyer for returning the forms from the discharge to the receiving end of the machine, and means for holding each form suspended until its rearward end has substantially cleared the conveyer.

36. In a machine of the class described, the combination of pressing mechanism adapted to press stockings on forms, a drier, a conveyer for returning the forms from the discharge to the receiving end of the machine, said conveyer including a traveling belt and a roller above the delivery end of such belt to hold the form suspended until its rearward end has substantially cleared the belt.

FRANK POPE.

Witnesses:
S. E. HIBBEN,
ROBERT DOBBERMAN.

Copies of this patent may be obtained for five cents each, by addressing the "Commissioner of Patents, Washington, D. C."